US010224124B2

(12) United States Patent
Harbers et al.

(10) Patent No.: US 10,224,124 B2
(45) Date of Patent: Mar. 5, 2019

(54) WELDING WASHERS FOR MICROWIRE WELDING

(71) Applicants: Gregory Harbers, Valencia, CA (US); Ming Wei Hung, Alhambra, CA (US); Fukang Jiang, Pasadena, CA (US)

(72) Inventors: Gregory Harbers, Valencia, CA (US); Ming Wei Hung, Alhambra, CA (US); Fukang Jiang, Pasadena, CA (US)

(73) Assignee: MINIPUMPS, LLC, Pasadena, CA (US)

(*) Notice: Subject to any disclaimer, the term of this patent is extended or adjusted under 35 U.S.C. 154(b) by 992 days.

(21) Appl. No.: 14/590,305

(22) Filed: Jan. 6, 2015

(65) Prior Publication Data

US 2015/0194236 A1    Jul. 9, 2015

Related U.S. Application Data

(60) Provisional application No. 61/924,498, filed on Jan. 7, 2014.

(51) Int. Cl.
| | |
|---|---|
| *B23K 26/00* | (2014.01) |
| *H01B 1/02* | (2006.01) |
| *B23K 26/21* | (2014.01) |
| *H01R 4/02* | (2006.01) |
| *H01R 43/02* | (2006.01) |
| *B23K 101/36* | (2006.01) |

(52) U.S. Cl.
CPC ............ *H01B 1/02* (2013.01); *B23K 26/21* (2015.10); *H01R 4/023* (2013.01); *H01R 4/027* (2013.01); *H01R 43/0221* (2013.01); *H01R 43/0263* (2013.01); *B23K 2101/36* (2018.08); *H01R 43/0249* (2013.01)

(58) Field of Classification Search
CPC .... B23K 26/21; B23K 35/02; B23K 2201/26; B23K 2201/38; H01L 31/02; H01B 1/02
USPC ........................................ 219/121.63, 121.64
See application file for complete search history.

(56) References Cited

U.S. PATENT DOCUMENTS

| | | | | |
|---|---|---|---|---|
| 4,025,152 | A * | 5/1977 | Jacobson ................. | H01R 4/38 403/344 |
| 6,343,904 | B1 * | 2/2002 | Wang ..................... | F16B 31/021 411/162 |
| 7,905,743 | B2 | 3/2011 | Foratier et al. | |
| 2001/0034145 | A1 | 10/2001 | Uratani et al. | |
| 2002/0136617 | A1 * | 9/2002 | Imahigashi .......... | H01Q 1/1214 411/533 |
| 2004/0060437 | A1 * | 4/2004 | Frost .................... | B01D 53/228 95/55 |

(Continued)

FOREIGN PATENT DOCUMENTS

| | | |
|---|---|---|
| JP | 2605210 Y2 | 7/2000 |
| KR | 10-2011-0018963 A | 2/2011 |

OTHER PUBLICATIONS

PCT International Patent Application No. PCT/US2015/010255, International Search Report and Written Opinion dated Apr. 29, 2015, 11 pages.

*Primary Examiner* — Dana Ross
*Assistant Examiner* — Brandon Harvey
(74) *Attorney, Agent, or Firm* — Morgan, Lewis & Bockius LLP

(57) ABSTRACT

In various embodiments, welding washers are utilized to establish electrical connections between electrically conductive wires and electrically conductive pins.

14 Claims, 8 Drawing Sheets

(56) References Cited

U.S. PATENT DOCUMENTS

| | | | |
|---|---|---|---|
| 2010/0062639 A1 | 3/2010 | Kohnishi et al. | |
| 2011/0287657 A1* | 11/2011 | Lee | H01R 4/2433 |
| | | | 439/395 |
| 2014/0103095 A1* | 4/2014 | Walker | H01L 24/78 |
| | | | 228/1.1 |

* cited by examiner

WELDING WASHERS FOR MICROWIRE WELDING

RELATED APPLICATION

This application claims the benefit of and priority to U.S. Provisional Patent Application No. 61/924,498, filed Jan. 7, 2014, the entire disclosure of which is hereby incorporated herein by reference.

TECHNICAL FIELD

In various embodiments, the present invention relates generally to welding washers used for micro-wire welding and welding processes utilizing such welding washers.

BACKGROUND

The welding process has numerous applications in many industries, including the aerospace, automotive, and consumer-electronics fields. Particularly for electronic products, continued reduction of size via dimensional scaling has placed demands on the welding processes utilized to connect disparate parts together. Of the many welding processes, laser welding is particularly useful in small-scale applications due to the ability to focus the laser light on welding areas less than a millimeter in diameter. In laser welding of a wire to an electrical contact, focused light energy is utilized to rapidly heat the weld zone, melting the wire along with the part of the contact to which the wire is being joined. The light energy intensity is controlled by beam size, voltage, pulse width, and may be utilized in single bursts or in pulses repeated at variably timed intervals. Although a variety of lasers may be used for laser welding, one common type of welding laser is a neodymium-doped yttrium-aluminum-garnet (Nd:YAG) laser. A Nd:YAG laser typically requires an inert cover gas such as helium or argon to protect the weld from atmospheric gases (e.g., oxygen) that might reduce the quality of the weld.

Advantageously, since laser light is utilized for joining in a laser-welding process, no current flows through the contact or wire, and there is no impact from electrical current polarity on the weld and no electrical connections to the welded contact. Thus, there is no heat generated in the contact by electrical current flow or resistance thereto. Further, as a laser is accurate and produces an energy pulse of repeatable power and duration, it is readily incorporated into manufacturing processes of practically any scale.

Although the laser welding process is accurate, variability in technician skill and experience may cause variability in products, especially on sub-millimeter-scale weld points. Specific fixtures and automation reduce this variability, but at small scales and in small quantities typical of products under development, the welding process is still manually completed by technicians. Furthermore, because a laser beam is utilized to form the weld, the laser welding process is necessarily limited to joining wires or other materials easily placed within the line-of-sight of the laser beam. In addition, some components to which wires are to be joined via laser welding are easily damaged by the intense laser light utilized in the welding process, which can impact production repeatability and yield. Finally, in typical laser-welding procedures, once a wire is welded to an electrical contact the relative geometry of the wire and the contact is fixed, and force applied to the wire in different directions may result in damage to, or even complete detachment of, the weld. Moreover, in many cases it is necessary to join multiple wires to a single electrical contact having limited surface area.

In view of the foregoing, there is a need for techniques and apparatuses enabling repeatable, small-scale laser welding of wires to electrical contacts.

SUMMARY

In accordance with various embodiments of the present invention, joining of wires to rigid electrical contact points (referred to herein as "pins") via laser welding is facilitated by the use of a welding washer that functions as an intermediate electrical path between the wire and the pin. In various embodiments, the welding washer defines an opening in which the pin is received and at least partially contained, establishing electrical contact between the washer and the pin. The welding washer also defines one or more channels into which wires may be at least partially inserted. The inserted wire is then welded to the welding washer itself, which establishes electrical contact between the wire and the pin (through the washer) while obviating the need for direct physical contact between the wire and the pin or exposure of the pin to the intense laser light of a laser-welding process.

In various embodiments of the invention, the wire-receiving channel of the welding washer incorporates a narrower section, and/or other containment features, that retain the wire in place prior to the welding procedure. In addition, because the wire is not joined directly to the pin, the welding washer may enable rotational movement of the welded wire around the pin without compromising the electrical contact between the wire and the pin; specifically, the washer may itself be free to rotate around the pin while retaining electrical contact therewith. In other embodiments, the pin-receiving opening of the washer incorporates one or more locking features (e.g., a non-circular shape and/or one or more cut-outs) that enable contact to pins having non-circular cross-sections and/or restrict the rotational movement of the pin (and thus the wire) with respect to the pin. In still other embodiments, the washer may be freely rotationally positioned with respect to the pin (either before or after the wire is welded to the washer), and then the washer itself may be welded (e.g., laser welded) to the pin to fix it in place and establish reliable electrical contact between the washer and the pin.

Welding washers in accordance with embodiments of the present invention may include multiple wire-receiving channels, thus enabling the electrical connection of multiple different wires to the same pin. In addition or instead, wire washers may even be stacked atop one another while contacting the same pin, which also enables the electrical connection of multiple wires to a single pin.

In an aspect, embodiments of the invention feature a welding washer for establishing an electrical connection between one or more electrically conductive wires and an electrically conductive pin. The welding washer includes, consists essentially of, or consists of an electrically conductive body (i) including, consisting essentially of, or consisting of an electrically conductive material, (ii) defining a pin-receiving opening for receiving at least a portion of the pin therewithin, and (iii) defining one or more wire-receiving channels each for receiving at least a portion of one of the one or more wires therewithin.

Embodiments of the invention feature one or more of the following in any of a variety of different combinations. At least one wire-receiving channel may have a longitudinal extent and may include a narrow longitudinal segment having a width smaller than a width of the remaining longitudinal extent. At least one wire-receiving channel may include one or more protrusions extending into the channel for securing the wire therewithin. The pin-receiving opening may have a substantially circular cross-section. The pin-receiving opening may have a non-circular (e.g., polygonal) cross-section. The pin-receiving opening may include an indentation and/or a protrusion for restricting rotational movement of the body with respect to the pin when the pin is received within the pin-receiving opening. The body may define one or more through-holes for increasing a surface area of a weld attaching at least one of the pin or the one or more wires to the body. The pin-receiving opening and at least one said wire-receiving channel may be oriented such that, when respectively received therein, the pin and the wire do not directly contact each other.

The electrically conductive material may include, consist essentially of, or consist of a metal and/or a conductive polymer. The electrically conductive material may include, consist essentially of, or consist of copper, gold, and/or palladium. The pin-receiving opening and at least one said wire-receiving channel may be oriented such that, when respectively received therein, the pin and the wire extend in substantially perpendicular directions. The one or more wire-receiving channels may include a plurality of discrete wire-receiving channels each configured to receive a different wire therewithin. The pin-receiving opening may be sized and shaped to snugly receive the at least a portion of the pin therewithin. A first portion of the pin may be received within the pin-receiving opening. A second portion of the pin may be received within a pin-receiving opening of a second welding washer (a) discrete from the welding washer and (b) disposed below the welding washer.

In another aspect, embodiments of the invention feature a method of making an electrical connection between one or more electrically conductive wires and an electrically conductive pin. An electrically conductive welding washer is disposed over the pin, the pin extending through at least a portion of an opening defined in the welding washer. A portion of the wire is disposed within a first channel defined in the welding washer, the portion of the wire not directly contacting the pin. The portion of the wire is welded to the welding washer.

Embodiments of the invention feature one or more of the following in any of a variety of different combinations. Welding the portion of the wire to the welding washer may include, consist essentially of, or consist of laser welding the portion of the wire to the welding washer. The pin may be welded to the welding washer. Welding the pin to the welding washer may include, consist essentially of, or consist of laser welding the pin to the welding washer. The pin may be welded to the welding washer before the portion of the wire is welded to the welding washer. The pin may be welded to the welding washer before the portion of the wire is disposed within the first channel. A portion of a second wire may be disposed within a second channel defined in the welding washer, the second channel being discrete from the first channel. The portion of the second wire may be welded to the welding washer.

A portion of the welding washer may be mechanically deformed around the pin to enhance contact therewith. A portion of the welding washer may be mechanically deformed around the wire to enhance contact therewith. An inert cover gas may be disposed over the portion of the wire during welding of the portion of the wire to the welding washer. The inert cover gas may include, consist essentially of, or consist of helium and/or argon. Disposing the portion of the wire within the first channel may include, consist essentially of, or consist of urging the portion of the wire past one or more protrusions extending into the first channel. A coating may be disposed over at least a portion of the welding washer, at least a portion of the pin, and/or at least a portion of the wire. The coating may include, consist essentially of, or consist of a conductive adhesive for securing the pin and/or the wire to the welding washer. The coating may be substantially water-repellent. The coating may include, consist essentially of, or consist of silicone, parylene, urethane, and/or epoxy.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. As used herein, the terms "substantially" and "approximately" mean ±10%, and, in some embodiments, ±5%. The term "consists essentially of" means excluding other materials that contribute to function, unless otherwise defined herein. Nonetheless, such other materials may be present, collectively or individually, in trace amounts.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawing, in which.

DETAILED DESCRIPTION

Figure 1:
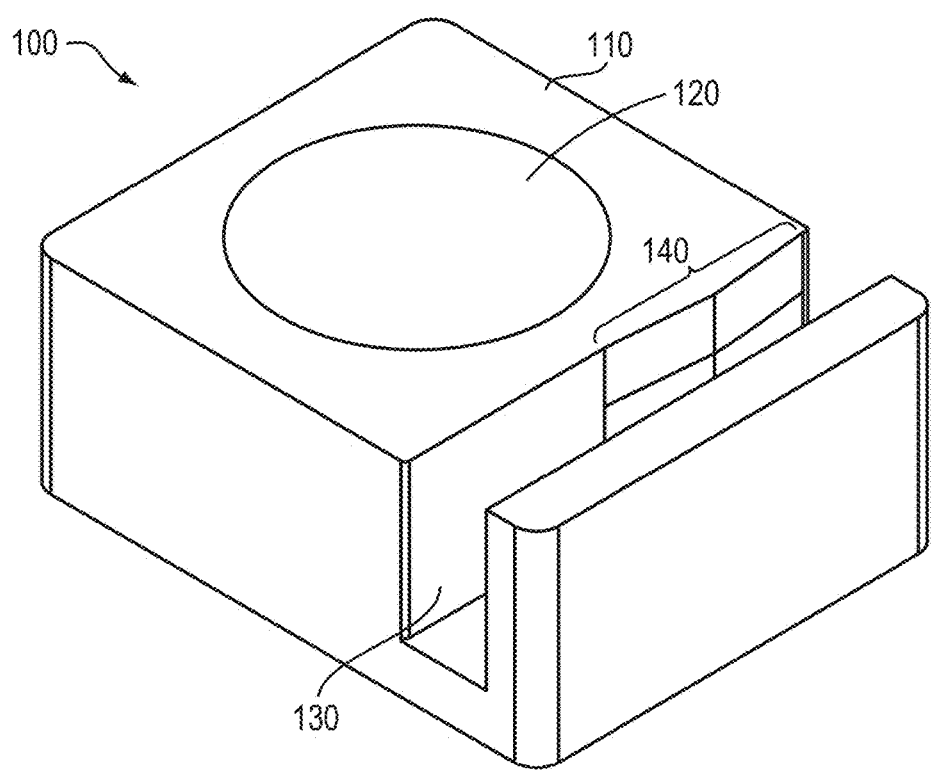
FIG. 1 is an isometric view of a welding washer in accordance with various embodiments of the invention.

FIG. 1 depicts an exemplary welding washer 100 in accordance with various embodiments of the present invention. As shown, a body 110 of the welding washer 100 defines therein both an opening (or "aperture") 120 into which a pin or other electrical contact may be at least partially inserted, as well as a channel 130 into which a portion of a wire is inserted (see FIG. 2). Typically, the opening 120 extends fully through the body 110. The body 110 of the welding washer 100 typically includes, consists essentially of, or consists of one or more conductive materials (e.g., metals and/or electrically conductive polymers) in order to establish electrical contact between the received wire and pin through the body 110. The material of the body 110 is also preferably "weld-conducive," i.e., capable of being partially melted or otherwise electrically and mechanically connected to another conductor (e.g., a wire and/or a pin) via welding processes such as laser welding. For example, the body 110 may include, consist essentially of, or consist of a metal such as copper, gold, or palladium. The material of body 110 may also be sufficiently malleable to enable the limited deformation (e.g., crimping) of the body 110 in the vicinity of the opening 120 and/or the channel 130 to increase the amount of mechanical contact between the body 110 and the wire and/or pin received therein.

Figure 2:
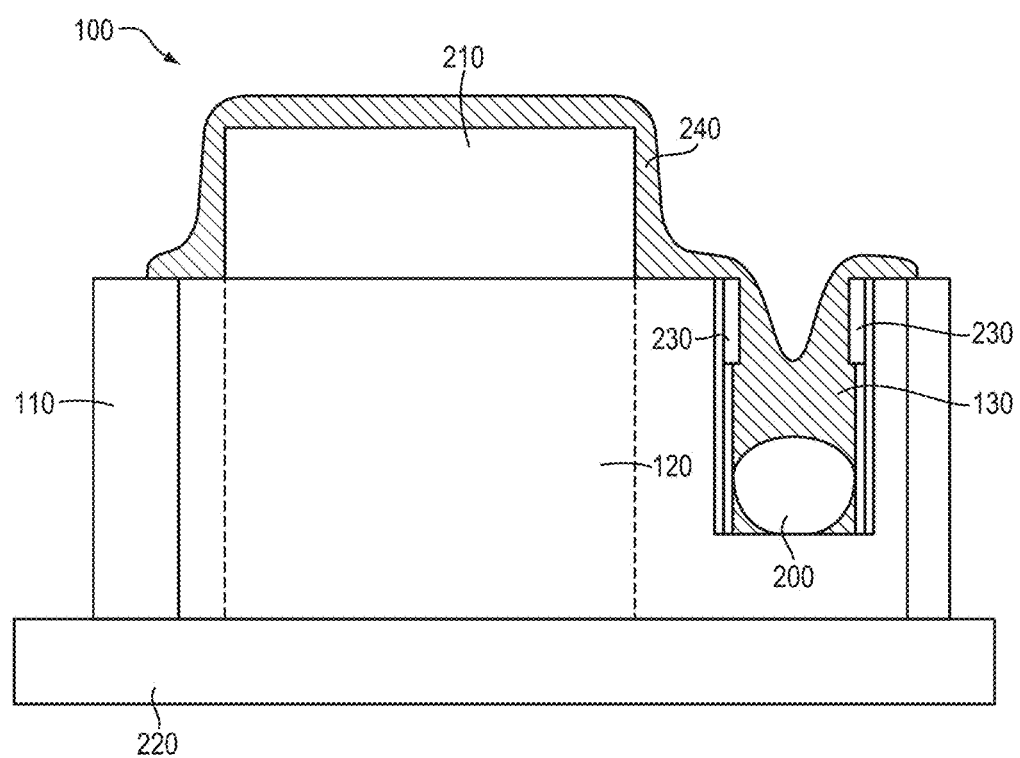
FIG. 2 is a cross-sectional view of a welding washer facilitating electrical connection between a pin and a wire in accordance with various embodiments of the invention.

Referring also to FIG. 2, the welding washer 100 may be utilized to produce and maintain electrical contact between a wire 200 and a pin 210 that, for example, protrudes from and is coupled to a substrate 220 (e.g., a circuit board). As shown, the pin 210 may protrude through the opening 120 substantially vertically, and the wire 200 may be received within the channel 130 substantially horizontally (i.e., substantially perpendicular to the direction in which the pin 210 extends), although other geometries and relative configurations of the opening 120 and the channel 130 may be suitable depending on the application. As used herein, a "pin" refers to any substantially rigid electrical contact point.

In various embodiments of the invention, the welding washer 100 is disposed over the pin 210 such that the pin 210 fits within the opening 120. As shown in FIG. 2, the terminal end of the pin 210 may protrude through the opening 120 (i.e., the thickness of the welding washer 100 may be less than the height of the pin 210), or the pin may terminate within the opening 120 and below the top surface of the body 110. The pin 210 may fit snugly within the opening 120 such that it physically contacts the body 110 of the washer 100, thereby establishing (and maintaining during operation) electrical contact between the body 110 and the pin 210. For example, the pin 210 may be press-fit within the opening 120 and/or at least partially secured within the opening 120 using a conductive adhesive. After the pin 210 is inserted into the opening 120, the body 110 surrounding the opening 120 may be partially deformed via mechanical force in order to increase the amount of physical contact between the pin 210 and the body 110 and/or to at least partially secure the pin 210 in place. In some embodiments of the invention, the body 110 is free to rotate around the pin 210 while maintaining physical and electrical contact therebetween. In various embodiments, any electrical and physical connection between the pin 210 and the body 110 once the pin 210 is inserted (if any) is augmented by welding the pin 210 to the body 110. For example, the pin 210 may be laser welded to the portion of the body 110 proximate the opening 120.

As shown in FIG. 2, the wire 200 is received within the channel 130 of welding washer 100 such that the end of wire 200 is contained within the channel 130 or protrudes slightly therefrom. This terminal end of the wire 200 is typically free of any surrounding insulation and thus suitable for welding. Other portions of the wire 200 not to be directly welded to the washer 100 may be at least partially surrounded by insulation. After the wire 200 is inserted into the opening 120, the body 110 surrounding the channel 130 may be partially deformed via mechanical force in order to increase the amount of physical contact between the wire 200 and the body 110 and/or to at least partially secure the wire 200 in place. The wire 200 may subsequently be welded (e.g., laser welded) to the body 110 in the proximity to the channel 130 to establish reliable electrical contact between the wire 200 and the body 110. Advantageously, in embodiments in which wire 200 is laser welded to body 110, any heat generated within the wire 200 away from the tip is insufficient to melt such insulation. In some embodiments of the invention, the weld is performed at a position along the wire 200 spaced away from the tip thereof, particularly if the tip protrudes from the channel 130. In such cases, laser welding near the tip of the wire may result in a portion of the wire being severed or having its cross-section reduced (or "necked down"), which may result in deleteriously high electrical resistance through the wire. In laser welding embodiments, the laser light utilized to weld the wire 200 and/or the pin 210 to the body 110 may be pulsed. The laser may be pulsed multiple times in the same weld position, and/or the laser beam may be translated with respect to the body 110 such that one or more pulses are utilized to form weld connections at each of multiple points along the body 110, wire 200, and/or pin 210. In some embodiments, the washer 100 is welded to the pin 210 prior to attachment of the wire 200 to the washer 100; however, such embodiments may not be preferred since they may restrict the direction of approach and/or attachment of the wire 200 to the body 110 (i.e., the orientation of the channel 130).

In various embodiments of the invention, a coating 240 may be applied over at least a portion of the washer 100, the pin 210, and at least a portion (e.g., a non-insulated portion) of the wire 200, as shown in FIG. 2. The coating 240 may be a biocompatible material such as medical-grade silicone, as in some embodiments the pin 210 may not be disposed within a hermetic enclosure. The coating 240 may also be a water-repellent conformal coating and may thus include, consist essentially of, or consist of, for example, parylene (i.e., a poly(p-xylylene) polymer), silicone, epoxy, one or more urethanes, and/or one or more potting materials. The coating 240 may additionally function as a conductive adhesive to further mechanically secure the pin 210 to the welding washer 100 and the welding washer 100 to the wire 200 inserted into channel 130.

In various embodiments of the present invention, both the pin 210 and the wire 200 are electrically conductive and weld-conducive. For example, the pin 210 and/or the wire 200 may include, consist essentially of, or consist of one or more metals such as aluminum, gold, silver, stainless steel, copper, palladium, or nickel. In some embodiments, at least a portion of the body 110 includes, consists essentially of, or consists of the same material (e.g., a metal) as the wire 200 and/or the pin 210.

As shown in FIGS. 1 and 2, the channel 130 of the welding washer 100 may incorporate one or more features that help maintain the wire 200 within the channel 130 after the wire 200 has been positioned therein. For example, the channel 130 may include a narrow section 140 having a width smaller than that of the remaining longitudinal extent of the channel 130 (e.g., the portion of the channel 130 containing the tip of wire 200 or in which the tip of wire 200 is contained). The wire 200 may be placed within the channel 130 such that it is secured in place by (e.g., press-fit within) the narrow section 140. As shown in FIG. 2, the narrow section 140 may extend vertically only over a portion of the channel 130, and the wire 200 may be urged through the narrow section 140 past the protrusions 230 and "locked" in place by protrusions 230 of the narrow section 140. As more easily observed in FIGS. 5A and 5B, the narrow section 140 may extend vertically over substantially the entire depth of the channel 130. In other embodiments, the narrow section extends vertically over only a portion of the depth of the channel 130 (as shown in FIG. 2) but extends horizontally (i.e., longitudinally) over the entire extend of the channel 130.

Figure 3:
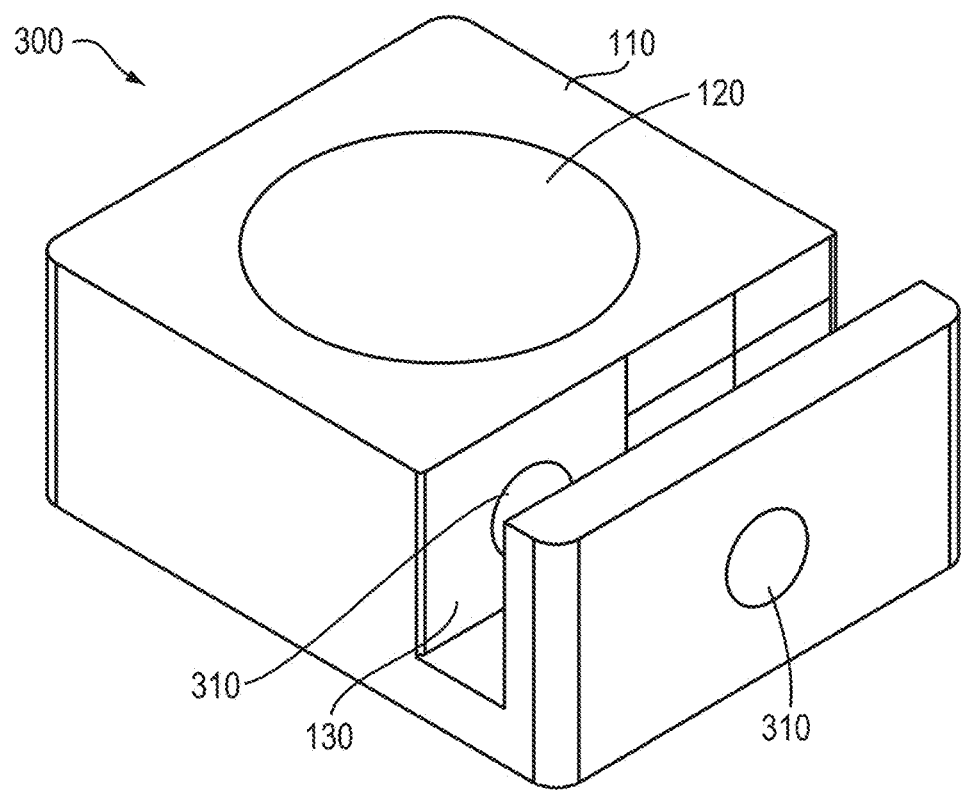
FIG. 3 is an isometric view of a welding washer incorporating through-holes in accordance with various embodiments of the invention.

FIG. 3 depicts a welding washer 300 in accordance with various embodiments of the present invention. As shown, the body 110 of the welding washer 300 defines one or more through-holes 310 through which the material of the body 110 or the wire 200 may flow when the wire 200 is welded to the body 110. The presence of the through-hole(s) 310 may increase the surface area of the weld between the wire 200 and the body 110, and may increase the strength of the weld. Thus, the pull force required to disconnect the welded wire 200 from the washer 300 is increased. One or more through-holes 310 may be defined within one or both walls of the channel 130, and may extend through the body 110 and/or into the opening 120.

Figure 4A:
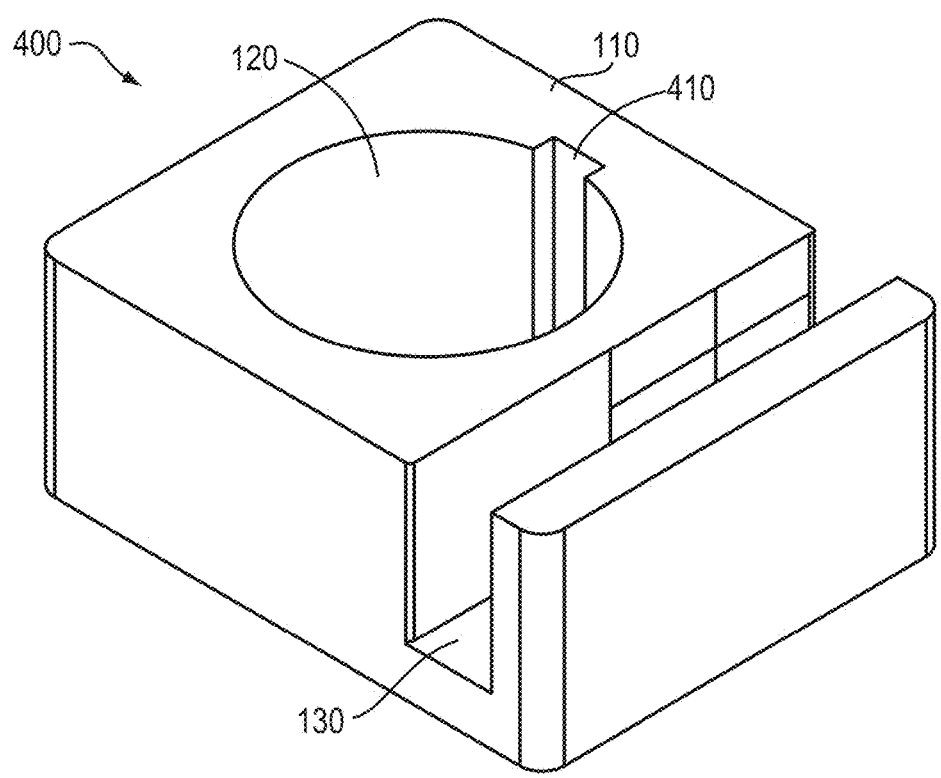
FIGS. 4A and 4B are isometric views of welding washers incorporating pin locking mechanisms in accordance with various embodiments of the invention.
Figure 4B:
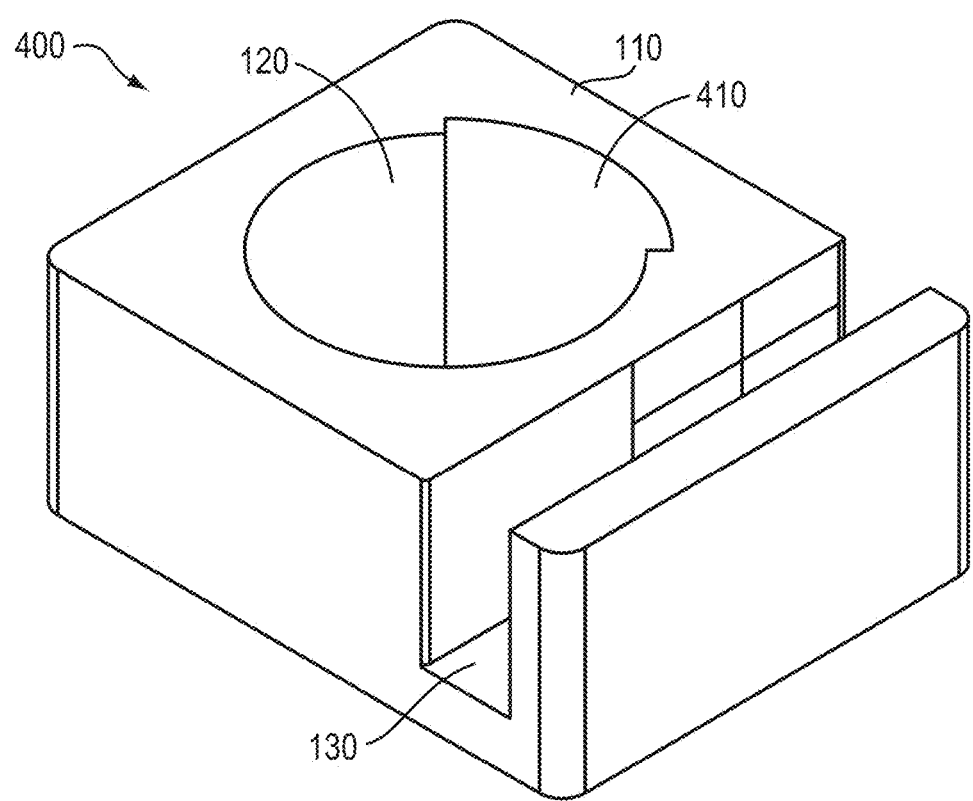
Figure 4C:
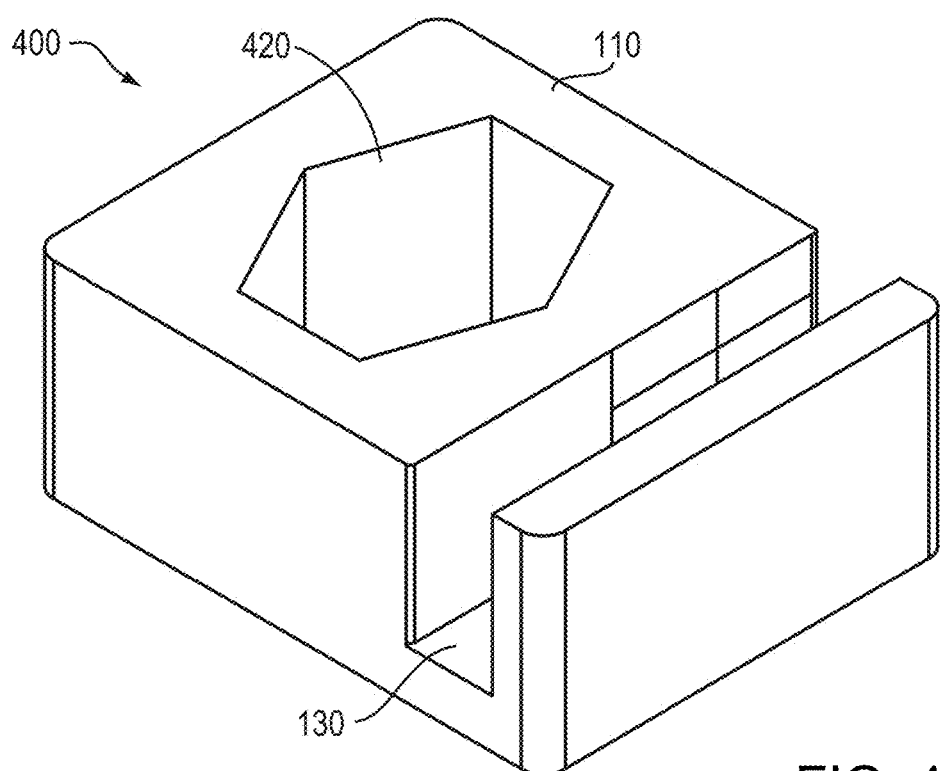
FIG. 4C is an isometric view of a welding washer defining a non-circular pin-receiving opening in accordance with various embodiments of the invention.

In various embodiments of the present invention, the welding washer incorporates one or more features that restrict rotational movement of the washer about the pin. For example, as shown in FIGS. 4A and 4B, the opening 1120 of a welding washer 400 may include one or more locking features 410. At least a portion of the pin 210 may have a shape complementary to that of the locking feature 410 and/or protrude into the locking feature 400, thereby preventing rotation of the welding washer 400 about the pin 210. The locking feature 410 may extend from or into the remaining part of the opening 120. Similarly, as shown in FIG. 4C, an opening 420 of the welding washer 400 may have a non-circular (e.g., square, hexagonal, or other polygonal) shape. When a pin 210 having a complementary shape to opening 420 is placed in opening 420, the pin 210 may lock in place to restrict rotational motion of the washer 400.

Figure 5A:
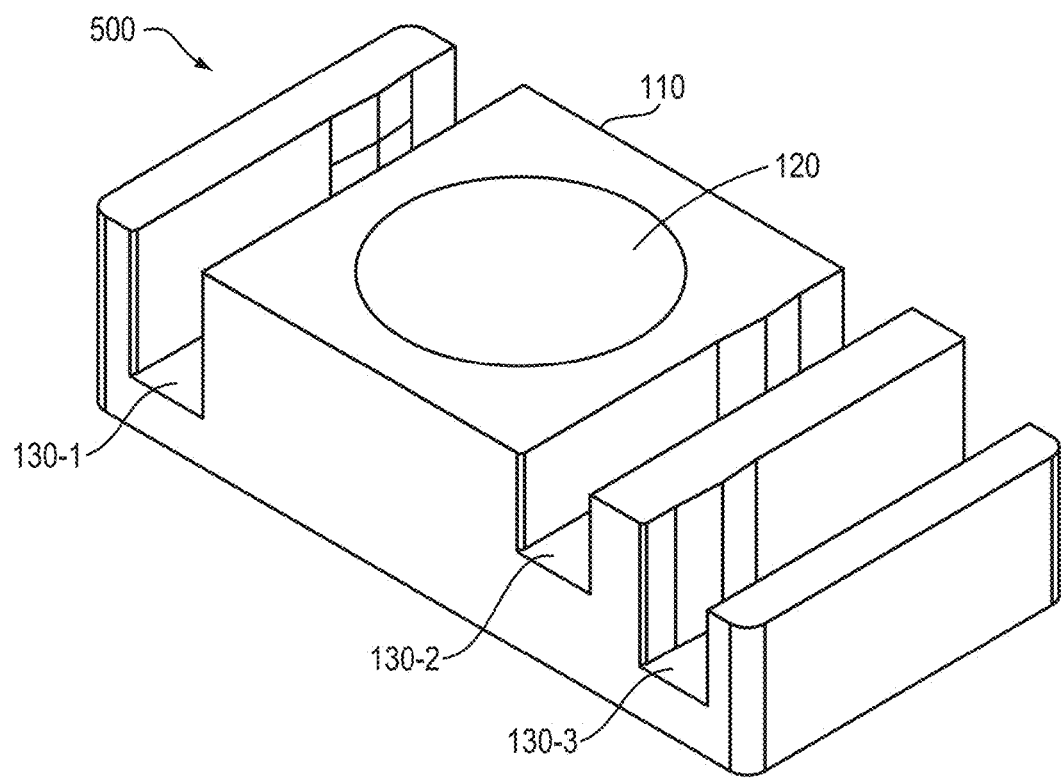
FIGS. 5A and 5B are isometric views of welding washers incorporating multiple wire-receiving channels in accordance with various embodiments of the invention.
Figure 5B:
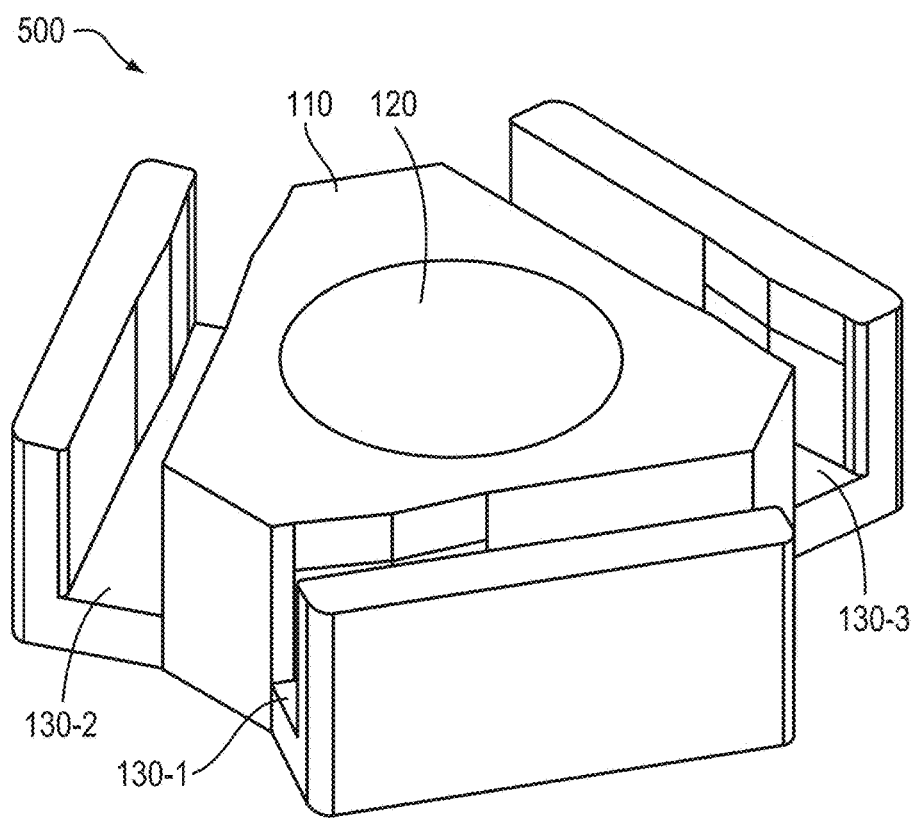

As shown in FIGS. 5A and 5B, the body 110 of a welding washer 500 may define multiple wire-receiving channels 130, thereby enabling electrical contact between multiple different wires 200 and a single pin 210. The welding washers 500 of FIGS. 5A and 5B incorporate three channels 130-1, 130-2, and 130-3, but welding washers in accordance with embodiments of the present invention may incorporate only two channels or more than three channels. Such multiple-channel configurations may be advantageous when electrical contact is desired between a single pin and multiple wires, but the pin is sufficiently small that welding the wires directly to the pin is difficult or impossible. Moreover, since each wire is confined within its own channel, the welding of one wire (and/or the heat generated by the welding process) is unlikely to impact the welding (or already existing connection) of another wire to the body of the welding washer. This distribution of the welding connection points of multiple wires across the body of the washer thus improves reliability and yield of such connections. As mentioned above, the multiple-channel configurations depicted in FIGS. 5A and 5B may be augmented or replaced by the stacking of multiple single- or multiple-channel welding washers on a single pin.

In accordance with embodiments of the present invention, welding washers may be fabricated by any of a variety of different techniques. For example, welding washers may be machined from one or more pieces of material, molded, stamped, or even fabricated via microelectromechanical (MEMS) techniques.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A welding washer for establishing an electrical connection between one or more electrically conductive wires and an electrically conductive pin, the welding washer comprising:
   an electrically conductive body (i) comprising an electrically conductive material, (ii) defining a pin-receiving opening for receiving at least a portion of the pin therewithin, and (iii) defining one or more wire-receiving channels each for receiving at least a portion of one of the one or more wires therewithin,
   wherein the pin-receiving opening and at least one said wire-receiving channel are oriented such that, when respectively received therein, the pin and the wire do not directly contact each other.

2. The welding washer of claim 1, wherein at least one said wire-receiving channel has a longitudinal extent and comprises a narrow longitudinal segment having a width smaller than a width of the remaining longitudinal extent.

3. The welding washer of claim 1, wherein at least one said wire-receiving channel comprises one or more protrusions extending into the channel for securing the wire therewithin.

4. The welding washer of claim 1, wherein the pin-receiving opening has a substantially circular cross-section.

5. The welding washer of claim 1, wherein the pin-receiving opening has a non-circular cross-section.

6. The welding washer of claim 5, wherein the cross-section of the pin-receiving opening is polygonal.

7. The welding washer of claim 1, wherein the pin-receiving opening comprises at least one of an indentation or a protrusion for restricting rotational movement of the body with respect to the pin when the pin is received within the pin-receiving opening.

8. The welding washer of claim 1, wherein the body defines one or more through-holes, different from the pin-receiving opening, for increasing a surface area of a weld attaching at least one of the pin or the one or more wires to the body.

9. The welding washer of claim 1, wherein the electrically conductive material comprises at least one of a metal or a conductive polymer.

10. The welding washer of claim 9, wherein the electrically conductive material comprises at least one of copper, gold, or palladium.

11. The welding washer of claim 1, wherein the pin-receiving opening and at least one said wire-receiving channel are oriented such that, when respectively received therein, the pin and the wire extend in substantially perpendicular directions.

12. The welding washer of claim 1, wherein the one or more wire-receiving channels comprise a plurality of discrete wire-receiving channels each configured to receive a different wire therewithin.

13. The welding washer of claim 1, wherein the pin-receiving opening is sized and shaped to snugly receive the at least a portion of the pin therewithin.

14. The welding washer of claim 1, wherein (i) a first portion of the pin is received within the pin-receiving opening, and (ii) a second portion of the pin is received within a pin-receiving opening of a second welding washer (a) discrete from the welding washer and (b) disposed below the welding washer.

\* \* \* \* \*